3,461,510
NONROTATABLE CABLE BUNDLING STRAP
Harry J. Holmes, Basking Ridge, N.J., assignor to Thomas & Betts Corporation, Elizabeth, N.J., a corporation of New Jersey
Filed July 31, 1968, Ser. No. 749,000
Int. Cl. B65d 63/00, 67/02
U.S. Cl. 24—16
9 Claims

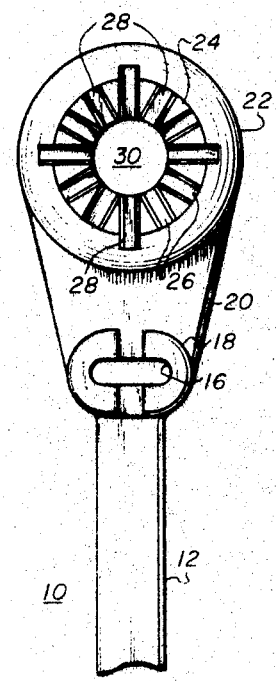
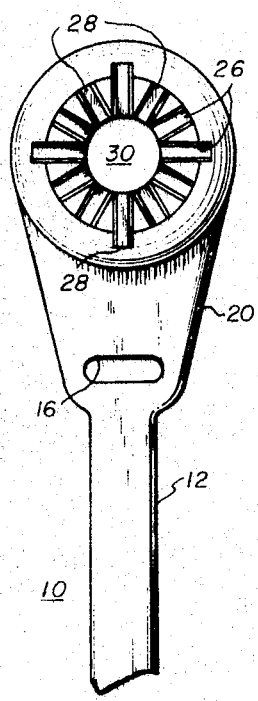
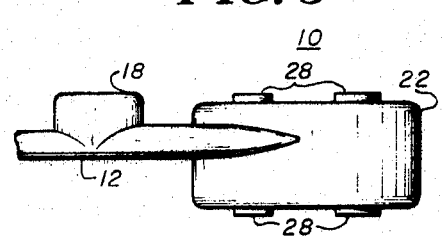
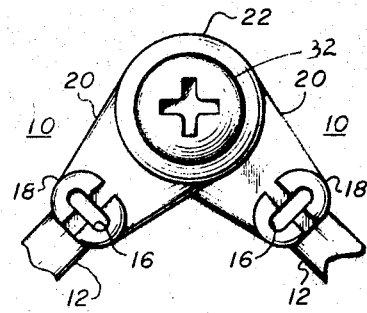
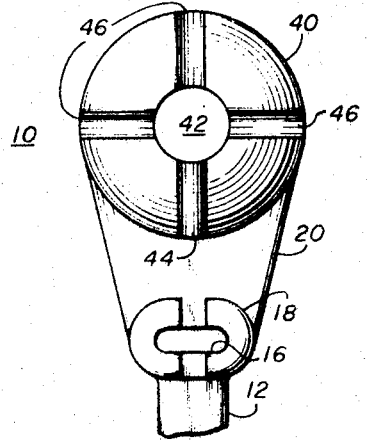
FIG. 1  FIG. 2
FIG. 3
FIG. 4
FIG. 5
INVENTOR.
HARRY J. HOLMES
BY
ATTORNEY United States Patent Office 3,461,510
Patented Aug. 19, 1969

ABSTRACT OF THE DISCLOSURE

The disclosure is directed to an article bundling strap capable of being mounted in a stacked fashion with provision to prevent rotation of one strap with respect to another. The bundling straps are provided with an additional tab wherein there is located an aperture for receipt of a fastening device for fastening one or more of the straps in stacked relationship, one atop the other, to a mounting surface. Mounted about the fastening device aperture are a plurality of radially spaced splines and keyways arranged to engage their opposite member in adjacent straps. Based upon the number of splines and keyways provided, a plurality of positions may be established between adjacent straps, for example, at positions of 90, 180 and 270 degrees with respect to one another. Splines and keyways may be fashioned in the material of the strap itself or may be fashioned in an insert placed within the additional tab, said insert also containing the aperture for receipt of the fastening device.

BACKGROUND OF THE INVENTION

Field of the invention

The invention is directed to the field of article bundling straps and more particularly for the mounting of a plurality of cable bundling straps to a single mounting point wherein it is desired to maintain a fixed relationship or displacement angle between respective straps. The device is useful the field of electrical wiring, positioning and directing of fluid hoses and similar types of uses where it is necessary to position and route articles along predetermined paths.

Description of the prior art

Bundling straps of the general type shown in the Logan Patent No. 3,022,557, issued Feb. 27, 1966, and owned by the assignee of the instant invention, provided mounting bosses for the receipt of fastening devices for fastening the strap to a mounting surface. If it was desired to place a number of straps upon a single fastening device, straps would be positioned one atop the other in a stacked relationship. No means was provided for locking the position of one strap with respect to another, therefore, if it is desired that two adjacent straps be mounted, for example, at 90° to one another, the user had to resort to the tightness of the fastening device to hold the respective straps in their established positions. Where shifting of the wire bundle, or loosening of the fastening device permitted the straps to shift one with respect to another, the predetermined relationship which was desired was destroyed.

SUMMARY OF THE INVENTION

The present invention overcomes the difficulties noted above with respect to the Logan patent and to other similar devices in the field. Positive means are provided in a mounting boss for engageably locking individual straps placed in a stack, upon a fastening device, to predetermined positions and retaining such straps in their preassigned positions. This is accomplished by means of providing a series of splines and keyways radially positioned with respect to the aperture which receives the fastening device. In a first embodiment, the splines and keyways are provided in a metallic insert which also has through its center a fastening device receiving aperture. Such insert is placed within the boss, or tap portion, of the strap in such a manner that the two are inseparable and such that the insert is nonrotatable with respect to the strap. In a further embodiment the tab, or boss, itself is provided with a fastening device receiving aperture about which are placed the required splines and keyways. The straps may then be placed upon the same fastening device passed through the respective fastening device apertures in each of the straps. The individual straps can be positioned in any one of the predetermined positions; such as at 90°, 180°, and 270 with respect to one another. Upon fastening of the fastening device the adjacent straps will be locked together in the established positions. By providing slightly sharpened splines it is possible for the bottom-most strap to partially dig into the mounting surface and thus provide for antirotation of the strap stack with respect to the mounting surface. It is therefore an object of this invention to provide an improved bundling strap which can be nonrotatably locked with respect to other straps in a stack of such straps.

It is still another object of this invention to provide an improved bundling strap providing non-rotatable locking means for engagement with other similar straps and wherein the locking means is provided in the material of the strap itself.

It is yet another object of this invention to provide an improved nonrotatable locking, stackable bundling strap wherein an insert is provided in a tab extension of the strap head to receive therein an insert having an aperture for receipt of a fastening device therein and providing about such aperture, in radial disposition, a plurality of splines and keyways to engage with corresponding elements of adjacent straps and thus permit lockable, nonrotatable engagement therebetween.

It is still another object of this invention to provide an improved stackable cable bundling strap which is nonrotatably lockable with adjacent straps and which provides sharpened splines for engagement with the mounting surface upon which the straps are mounted to prevent rotation of such stack of cable bundling straps or individual straps.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings

FIG. 1 is a front elevation of a nonrotatable bundling strap constructed in accordance with the concepts of the invention.

FIG. 2 is a rear elevation of the strap of FIG. 1.

FIG. 3 is a side elevation of the head portion of the bundling strap of FIG. 1.

FIG. 4 is a front elevation of the head portions of two interlocking cable bundling straps of FIG. 1.

FIG. 5 is a front elevation of the head portion of a cable bundling strap constructed in accordance with an alternative embodiment of the invention.

DESCRIPTION OF THE PREFERRED EMBODIMENT

Turning now to FIGS. 1, 2 and 3 there is shown a cable bundling strap 10 constructed in accordance with the concepts of the invention. Strap 10 has a body portion 12 terminating in a tapered end portion 14 at a first end. At a second end there is placed a raised boss 18 having a body strap receiving aperture 16 therethrough. Extending further from the end of the strap 10 in the area of the raised boss 18 is a tab 20 which terminates in a further raised boss 22. Within the raised boss 22 is a metallic insert 24 into which are placed a plurality of keyways 26 and upon which are placed a number of raised splines 28. Through the center of the insert 24 is a fastening device receiving aperture 30. The arrangement of these splines 28 and the keyways 26 on the front of the strap 10, as shown in FIG. 1, and the back of the strap 10, as shown in FIG. 2, is the same. Viewing the strap from the side, as is shown in FIG. 3, it is noted that the splines 28 extend above the boss 22 when adjacent straps 10 were placed one atop another with a fastening device positioned through the fastening device receiving aperture 30. The individual straps 10 may be rotated such that the splines 28 of a first strap 10 will enter the keyways 26 of a second strap thus locking their position to one another. Then upon the tightening of the fastening device 32 the position established by the engaged splines 28 and keyways 26 will be held, as shown in FIG. 4. In the present arrangement, as is shown in FIGS. 1 and 2, positions of 90°, 180° and 270° with respect to one another can be established. However, any desired position can be established merely by adding additional splines 28 and keyways 26.

FIG. 5 shows an alternative arrangement wherein tab 20 terminates in a boss 40 having a central aperture 42 for receipt of a fastening device therein. A spline 44 and keyways 46 extend radially from fastening device aperture 42 towards the edges of boss 40. The opposite side of boss 40 is arranged in a similar manner. Again the splines 44 and keyways 46 of the adjacent straps 10 are made to engage to establish the positions of the straps 10. Any arrangement of splines 44 and keyways 46 can be employed to establish the desired positions.

In addition, splines 44 and 28 may be somewhat sharpened to permit them to bite into the mounting surface upon tightening of the fastening device, thus preventing rotation of the strap or strap stack with respect to the mounting surface.

While there have been shown and described and pointed out the fundamental novel features of the invention as applied to the preferred embodiments, it will be understood that various omissions and substitutions and changes of the form and details of the devices illustrated and in their operation may be made by those skilled in the art without departing from the spirit of the invention.

The embodiments of the invention in which an exclusive property or privilege is claimed are defined as follows:

1. A stackable, nonrotatable cable bundling strap arranged to be nonrotatably locked with adjacent stacked straps comprising: an elongated strap body having a tapered first end; there being a boss at the second end of said strap body; a strap receiving aperture in said boss for receipt of said strap body therethrough; tab means coupled to said boss; therebeing an aperture in said tab for receipt therein of a fastening device; and a plurality of splines and keyways radially disposed about said aperture whereby the splines and keyways of adjacent straps are caused to engage in a locked nonrotatable stack when a fastening device is passed through the apertures of said stacked straps and tightened.

2. A strap, as defined in claim 1, wherein said splines and keyways are formed of the material surrounding said aperture.

3. A strap, as defined in claim 1, further comprising an insert positioned in said tab, said insert having said aperture therethrough and having said splines and keyways formed thereon.

4. A strap, as defined in claim 3, wherein said insert is metallic.

5. A strap, as defined in claim 3, wherein said insert is formed of sintered powdered metal.

6. A strap, as defined in claim 1, wherein adjacent straps are lockable at a plurality of angles.

7. A strap, as defined in claim 1, wherein adjacent straps are lockable at predetermined angles.

8. A strap, as defined in claim 1, wherein adjacent straps are lockable at predetermined angles of 90°, 180° and 270° with respect to one another.

9. A strap, as defined in claim 1, wherein said splines are sharpened whereby the tightening of said strap of a mounting surface by a fastening device causes the splines of the strap in contact with said surface to engage said surface and prevent rotation of said strap with respect to said surface.

References Cited

UNITED STATES PATENTS 3,009,220 11/1961 Fein.
3,074,675 1/1963 Brown.
3,147,523 9/1964 Logan.

DONALD A. GRIFFIN, Primary Examiner